Inventors
CARL G. FLYGARE
HERBERT A. SILVEN
By Harold W. Eaton
Attorney

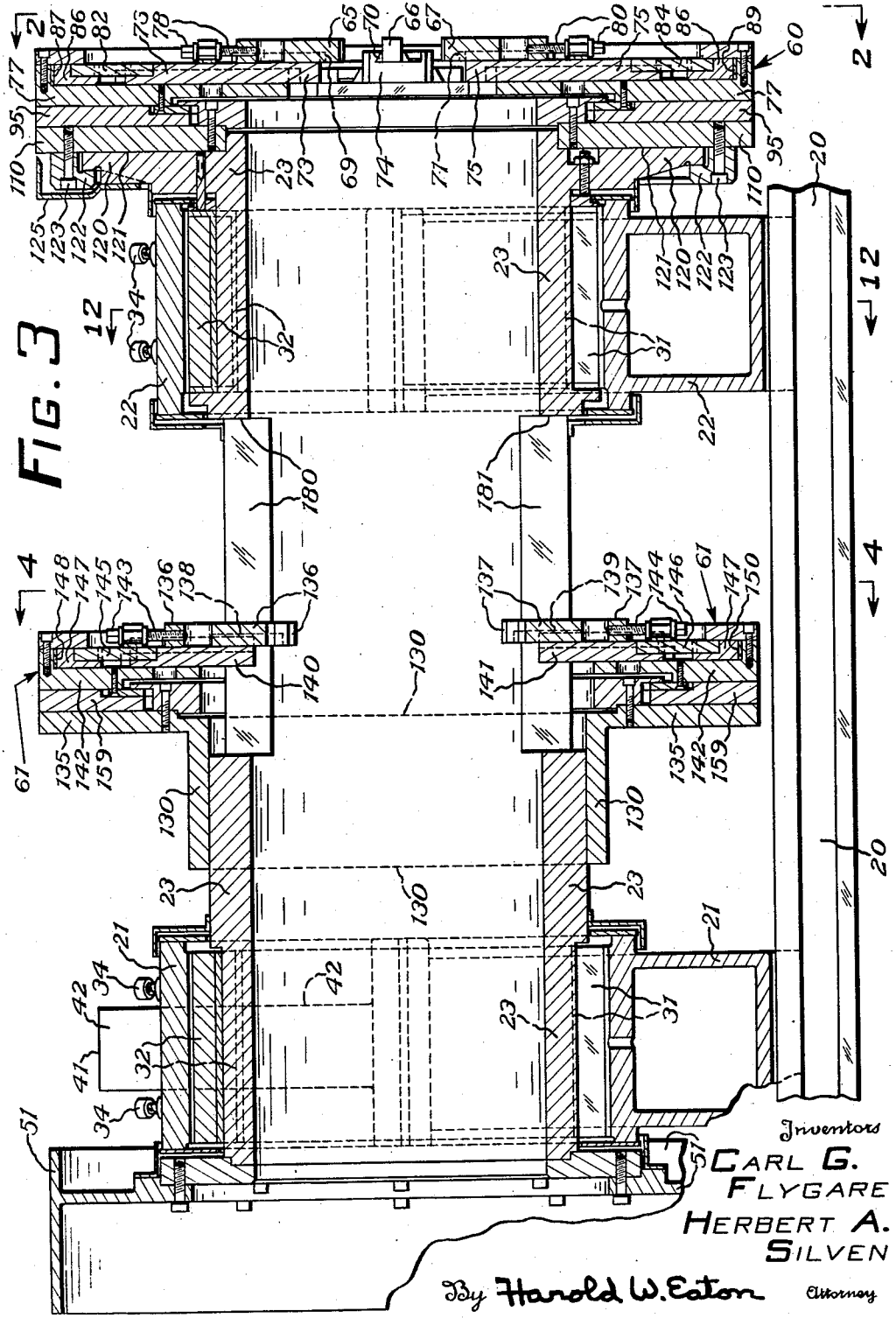

Inventors
CARL G. FLYGARE
HERBERT A. SILVEN
By Harold W. Eaton
Attorney

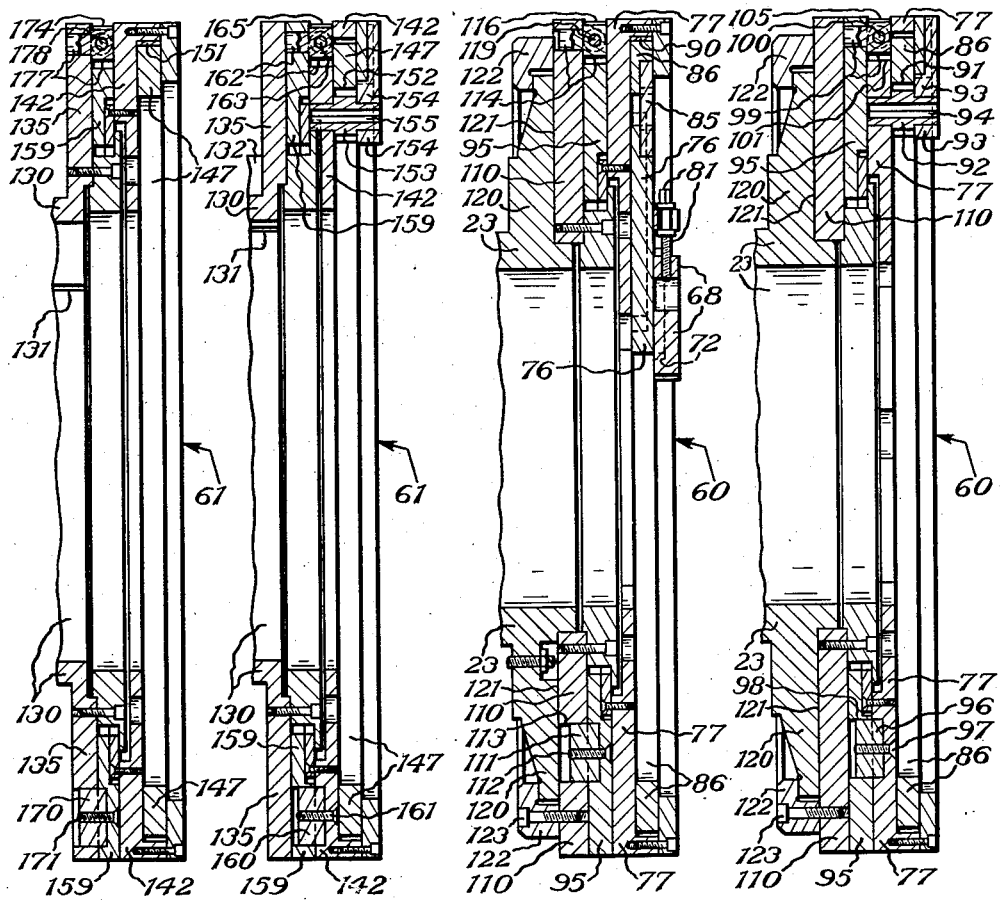
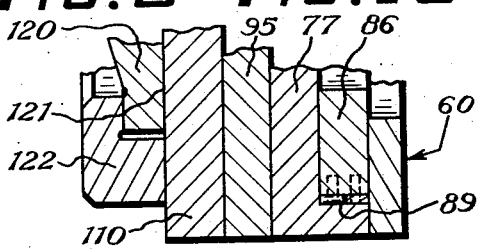

Patented Mar. 14, 1944

2,344,243

UNITED STATES PATENT OFFICE 2,344,243

GRINDING MACHINE WORK HEAD

Carl G. Flygare and Herbert A. Silven, Worcester, Mass., assignors to Norton Company, Worcester, Mass., a corporation of Massachusetts Application April 8, 1942, Serial No. 438,092

11 Claims. (Cl. 51—237)

The invention relates to grinding machines, and more particularly to a work head for chucking an irregularly shaped work piece.

One object of the invention is to provide a simple and thoroughly practical work head for a grinding machine for rotatably supporting a relatively long, irregularly shaped work piece for a grinding operation. Another object of the invention is to provide a work head having a hollow spindle which supports a pair of spaced, relatively adjustable work supporting and centering chucks.

Another object of the invention is to provide a work head having a fixed chuck at one end and a longitudinally adjustable chuck spaced therefrom which are arranged to support and center an irregularly shaped work piece. A further object of the invention is to provide a work spindle having two spaced longitudinally adjustable work supporting chucks, one of which is adjustable rotarily and angularly relative to the other to support an irregularly shaped work piece for a grinding operation. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of a grinding machine work head;

Fig. 3 is a vertical sectional view, taken approximately on the line 3—3 of Figs. 2 and 4;

Fig. 7 is a cross-sectional view, taken approximately on the line 7—7 of Fig. 4;

Fig. 8 is a cross-sectional view, taken approximately on the line 8—8 of Fig. 4;

Fig. 9 is a cross-sectional view, taken approximately on the line 9—9 of Fig. 2;

Fig. 10 is a cross-sectional view, taken approximately on the line 10—10 of Fig. 2;

Figure 1:
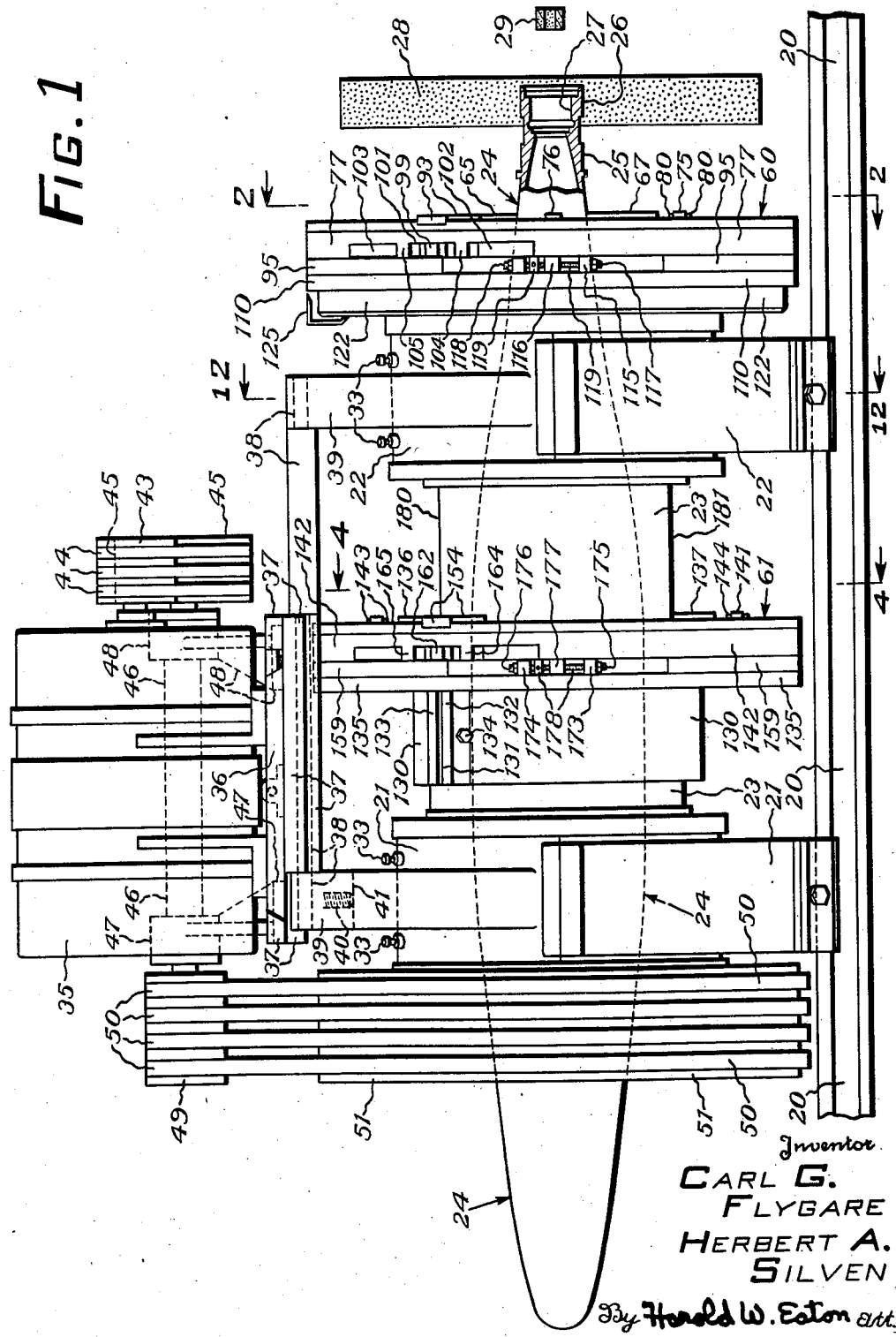
Figure 2:
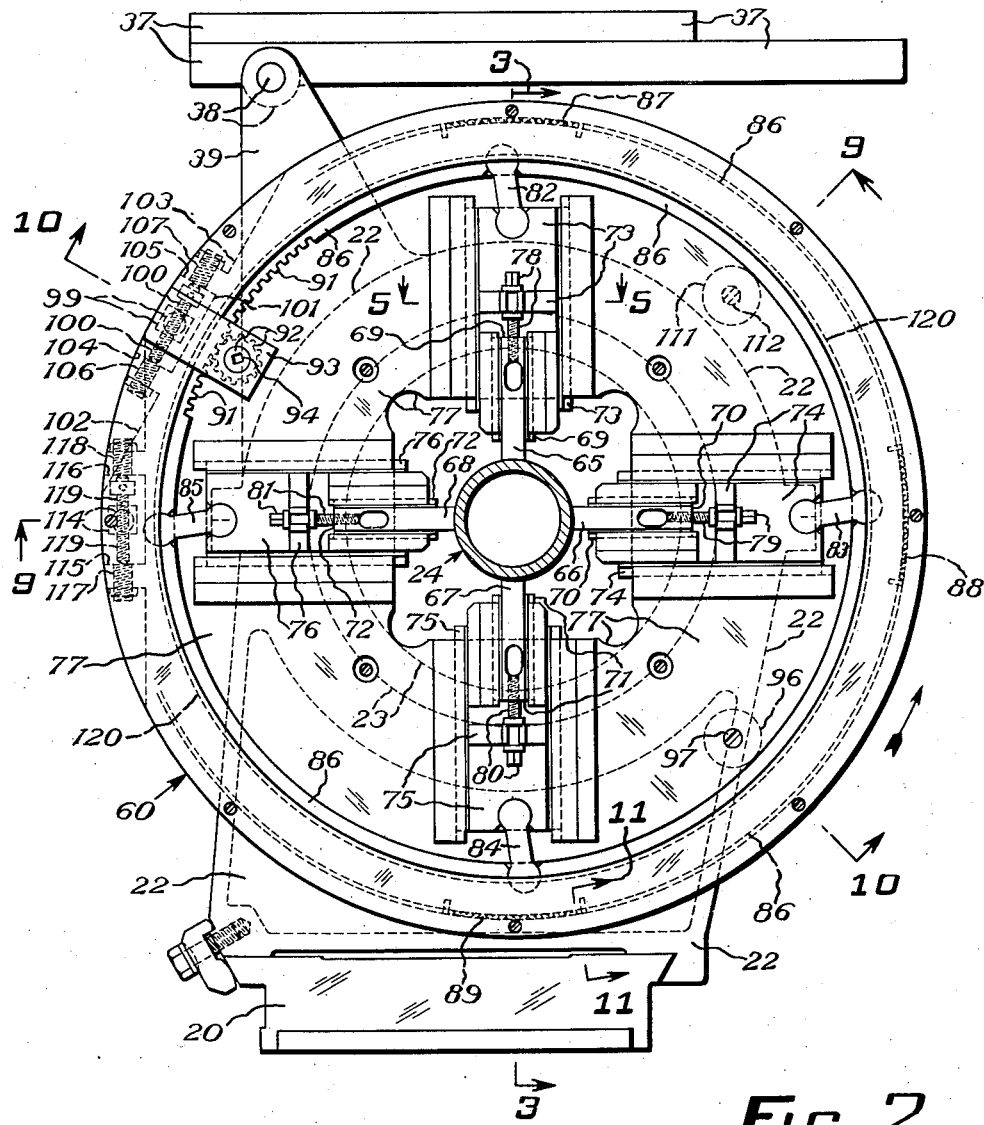
Fig. 2 is a right-hand end elevation of the work head, on an enlarged scale, taken approximately on the line 2—2 of Fig. 1, showing the work piece in cross section.

Fig. 11 is a fragmentary cross-sectional view, on an enlarged scale, taken approximately on the line 11—11 of Fig. 2; and Fig. 12 is a fragmentary cross-sectional view, on a reduced scale, taken approximately on the line 12—12 of Figs. 1 and 3, through one of the work spindle bearings.

An improved work head for a grinding machine has been illustrated in the drawings. A work table 20 serves as a support for a pair of spaced frames 21 and 22 which serve rotatably to support a hollow rotatable work supporting and centering spindle 23 for supporting a relatively long, irregularly shaped work piece, such as an aeroplane propeller blade 24, during a grinding operation in which external cylindrical hub surfaces 25 and 26 and an internal surface 27 are successively ground by means of grinding wheels 28 and 29, respectively.

The frames 21 and 22 are provided with bearings for rotatably supporting the work spindle 23. These bearings are substantially identical, consequently only one has been illustrated in detail in Fig. 12. These bearings comprise a pair of lower partial bearing members 30 and 31 which are spaced from each other on the frames 21 and 22, respectively, and an upper adjustable bearing member or shoe 32 which is held in adjusted position by means of spaced adjusting screws 33 and 34.

A motor driven mechanism is provided for driving the spindle 23 during a grinding operation, comprising an electric motor 35 which is supported on a transversely adjustable platen 36. The platen 36 is in turn slidably supported on a pivotally mounted plate 37 which is pivoted on a rock shaft 38. The rock shaft 38 is in turn supported by a bracket 39 formed integral with the frames 21 and 22, respectively. An adjusting screw 40 is provided which is screw threaded through the plate 37 and abuts against a surface 41 formed on a bracket 42 formed integral with the frame 21, by means of which the motor support 37 may be rocked to tension the work spindle driving belts. No electric controls for the motor 35 are shown since such motor controls and the wiring arrangement required are well known. The motor 35 is provided with a multi-V-groove pulley 43 which is connected by multiple V-belts 44 with a multiple V-groove pulley 45 which is mounted on one end of a rotatable jack shaft 46. The jack shaft 46 is journalled in suitable bearings in the brackets 47 and 48 mounted on the rear of the plate 37. A multiple V-groove pulley 49 is mounted on the other end of the jack shaft 46 and is connected by multiple V-belts 50 with a pulley 51 mounted on the left-hand end of the hollow work spindle 23 (Figs. 1 and 3).

The improved work head is particularly adapted to chuck relatively long, irregularly shaped work pieces such as, for example, aeroplane propeller blades which may be several feet in length. In supporting a long work piece such as a propeller blade 24, it is desirable to provide more than one point of support in order that the blade may be accurately aligned, centered and positioned for a grinding operation. A multiple jaw chuck 60 is supported on the right-hand end of the work spindle 23 (Figs. 1 and 3) for supporting the hub end of the blade 24. This chuck is supplemented by a second multiple jaw chuck 61 which is spaced from the chuck 60 and is adjustable longitudinally relative to the spindle 23.

Figure 5:
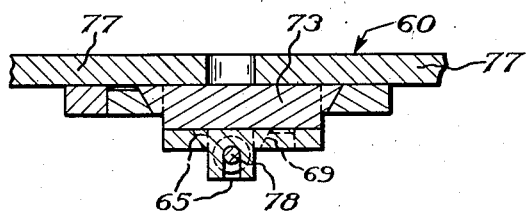
Fig. 5 is a fragmentary cross-sectional view, on an enlarged scale, taken approximately on the line 5—5 of Fig. 2, through one of the work chuck jaw slides.

The chuck 60 is a multiple jaw chuck in which the jaws are independently adjustable and also may be simultaneously actuated for clamping a work piece therein. The chuck 60 is arranged so that it may be rotarily adjustable relative to the work spindle 23 and is also mounted so that it may be adjusted laterally, that is, in a plane normal to the axis of the work spindle 23 in two directions. The chuck 60 comprises a plurality of work engaging jaws 65, 66, 67 and 68 which are formed integral with dovetailed slides 69, 70, 71 and 72. The dovetailed slides are in turn supported in dovetailed slides 73, 74, 75 and 76 which mate with correspondingly shaped ways attached to a chuck plate 77 (Fig. 5). Adjusting screws 78, 79, 80 and 81 are connected between the dovetailed slides 69, 70, 71 and 72 and the dovetailed slides 73, 74, 75 and 76, respectively (Figs. 2 and 3), by means of which the chuck jaws 65, 66, 67 and 68 may be independently adjustable relative to the dovetailed slides 73, 74, 75 and 76, respectively.

A mechanism is provided for simultaneously moving the slides 73, 74, 75 and 76 to and from an operating position, comprising a plurality of links 82, 83, 84 and 85 each of which is provided with circular shaped ends which mate with correspondingly shaped sockets formed in the outer ends of the dovetailed slides 73, 74, 75 and 76. The other ends of the links 82, 83, 84 and 85 mate with correspondingly shaped sockets formed in an annular ring 86. The annular ring 86 is rotatably supported by means of a plurality of needle bearings 87, 88, 89 and 90 (Figs. 2, 9 and 11). The chuck jaws 65, 66, 67 and 68 have been illustrated in engagement with a work piece 24 for a grinding operation.

When it is desired to release the chuck jaws to remove the ground work piece 24 from the chuck 60, the ring 86 may be rotated in a counterclockwise direction which serves to rock the links 82, 83, 84 and 85 also in a counterclockwise direction to withdraw the slides 73, 74, 75 and 76 so as to release the work piece 24. A portion of the internal surface of the ring 86 is provided with an internal gear segment 91 which meshes with a pinion 92. The pinion 92 is rotatably supported at one end by a bracket 93 and at the other end by the chuck plate 77. When it is desired simultaneously to actuate the jaws of the chuck 60, a wrench is applied to a square-shaped aperture 94 formed within the pinion 92 to rotate the same to turn the ring 86 within its supporting bearings so as to simultaneously actuate the work clamping jaws 65, 66, 67 and 68.

In order to facilitate a lateral adjustment in two directions, the chuck plate 77 is supported on a plate 95. A pivot stud 96 is fastened to the plate 77 by means of a screw 97. The pivot stud 96 fits within a correspondingly shaped circular aperture 98 formed in the plate 95. A screw adjusting mechanism is provided at a point substantially diametrically opposite the pivot stud 96, comprising a stud 99 which is fastened to the plate 95. An adjusting screw 100 is screw threaded through the stud 99. The plate 77 is provided with a cut-out portion 101 (Fig. 2) and cut-out portions 102 and 103 which form a pair of projecting lugs 104 and 105 which serve as supports for a pair of thrust screws 106 and 107. The thrust screws 106 and 107 are adjusted to bear against the ends of the adjusting screw 100 to form end thrust members therefor. It will be readily apparent from the foregoing disclosure that adjustment of the screw 100 will be transmitted through the thrust screws 106 and 107 to impart a lateral adjustment to the plate 77 which pivots about the stud 96. This lateral adjustment of the plate 77 is in a direction normal to the axis of the work head spindle 23 and facilitates a transverse or lateral adjustment of the work piece when desired.

A second lateral adjustment of the plate 77 is provided so that the chuck assembly may be adjusted laterally in two directions if desired. The plate 95 is supported for a pivotal lateral adjustment on a plate 110. A pivot stud 111 is fastened to the plate 95 by a screw 112. The pivot stud 111 fits within a circular aperture 113 formed in the plate 110. A stud 114 is fixedly supported in the plate 110. The plate 95 is provided with cut-out portions, forming a pair of lugs 115 and 116 which serve as supports for a pair of aligned end thrust screws 117 and 118. An adjusting screw 119 is screw threaded through the stud 114 and is positioned between the end thrust screws 117 and 118. The thrust screws 117 and 118 are adjusted so that their ends bear against the adjusting screw 119. It will be readily apparent from the foregoing disclosure that adjustment of the screw 119 will be imparted to swivel the plate 95 relative to the plate 110 about the axis of the pivot stud 111 to impart a lateral adjustment to the chuck 60.

In order to facilitate the chucking of an irregularly shaped work piece, such as propeller blades having different pitches, it is desirable to provide a rotary adjustment for the chuck 60 so that the entire chuck assembly may be rotatably adjusted relative to the chuck 61 when desired. The work spindle 23 is provided with an integral flange 120 having a plane face 121 which is positioned against a plane face on the plate 110. An annular flanged member 122 is held in position on the plate 110 by a plurality of clamping screws 123 by means of which the plate 110 together with the chuck parts supported thereby may be clamped in rigid adjusted position relative to the flange 120 and the work head spindle 23. The periphery of the plate 110 is provided with graduations (not shown) and an index pointer 125 (Fig. 3) in order to facilitate rotary or angular adjustment of the chuck 60. By means of the graduations and the index pointer 125, the chuck 60 may be rotated the desired number of degrees, after which it may be clamped in adjusted position by tightening the clamping screws 123.

The chuck 61 for supporting the work piece or propeller blade 24 at a distance spaced from the hub is arranged so that it may be adjusted longitudinally relative to the spindle 23 and also so that the chuck jaws may be independently adjusted or simultaneously moved as well as a double lateral adjustment of the chuck assembly to facilitate positioning the work piece as desired. A slidably mounted sleeve 130 surrounds the work spindle 23. The sleeve 130 is provided with a saw cut 131 forming two bosses 132 and 133 through which a clamping screw 134 passes. The clamping screw 134 passes through a clearance hole in the boss 132 (Fig. 4) and is screw threaded into the boss 133. The sleeve 130 may be readily clamped in adjusted position on the spindle 23 by clamping the clamping screw 134. The sleeve 130 is provided with a radially extending integral flange 135 which serves as a support for the chuck 61. The chuck 61 is provided with a pair of independently adjustable work engaging jaws 136 and 137 which are formed integral with dovetailed slides 138 and 139. The dovetailed slides 138 and 139 are in turn supported by dovetailed slides 140 and 141, and the slides 140 and 141 are supported by a chuck plate 142. A pair of adjusting screws 143 and 144 are provided which are interposed between the dovetailed slides 138—140 and 139—141, respectively, to facilitate independent adjustment of the chuck jaws 136 and 137.

Figures 4, 6:
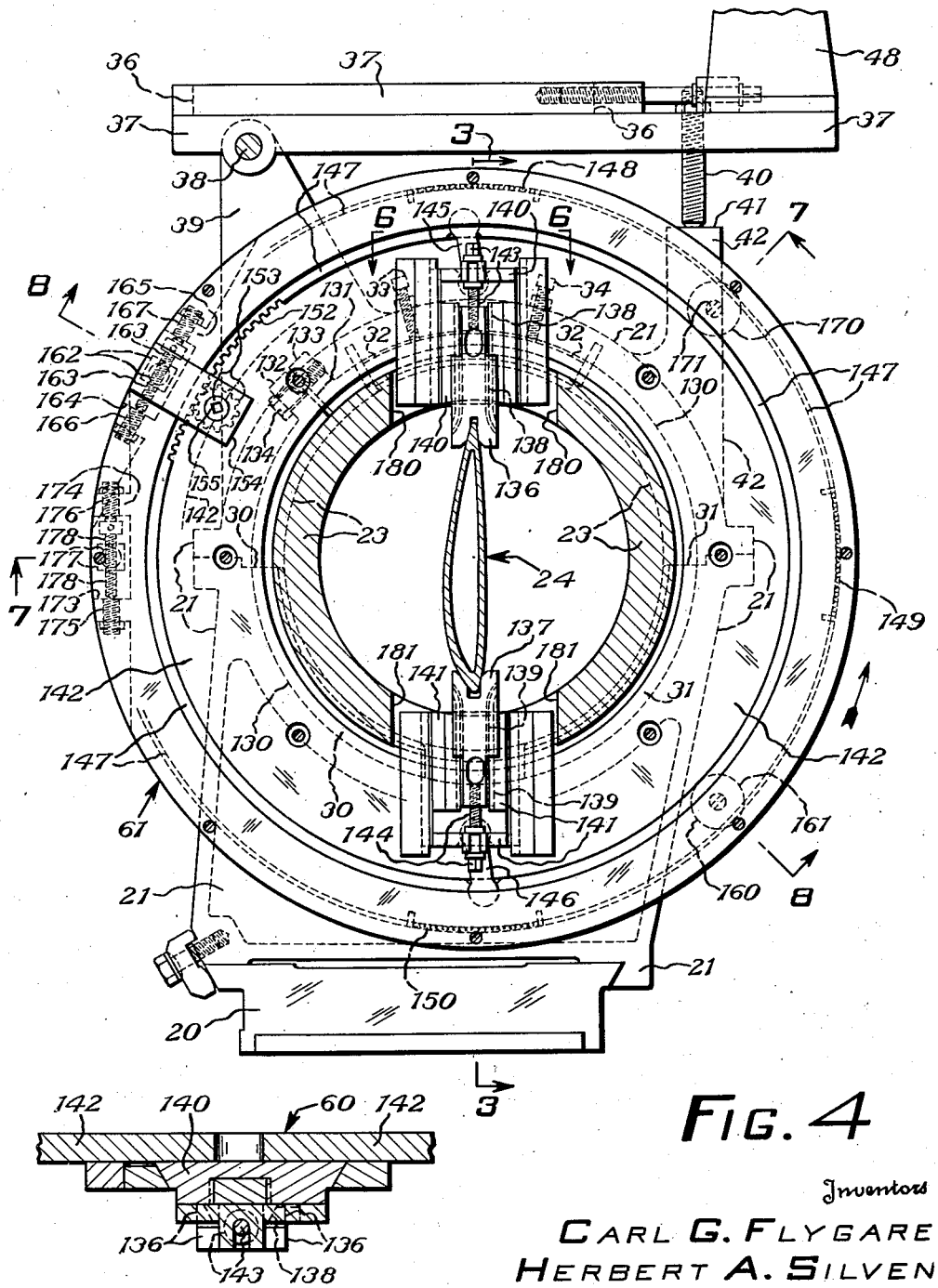
Fig. 4 is a cross-sectional view, taken approximately on the line 4—4 of Figs. 1 and 3.
Fig. 6 is a fragmentary cross-sectional view, on an enlarged scale, taken approximately on the line 6—6 of Fig. 4, through one of the chuck jaw slides.

It is desirable to provide means for simultaneously moving the chuck jaws 136 and 137 to and from an operative position. A pair of links 145 and 146 are provided, having circular shaped ends which mate with correspondingly shaped sockets on the outer ends of the slides 140 and 141, respectively. The outer ends of the links 145 and 146 mate with correspondingly shaped apertures formed in a rotatable annular ring 147. The ring 147 is rotatably supported within the chuck by a plurality of needle bearings 148, 149, 150 and 151 (Figs. 4 and 7). A rack and gear mechanism is provided for adjusting the position of the ring 147, comprising an internal gear segment 152 which meshes with a rotatable pinion 153 carried by a bracket 154. A square aperture 155 is provided within the pinion 153. When it is desired to clamp or release a work piece 24 from the chuck 61, a wrench is applied to the aperture 155 to rotate the pinion 153 which in turn transmits a corresponding motion to the internal gear teeth 152 so as to rotate the ring 147 as desired. The jaws 136 and 137 are shown in an operative position. When it is desired to release the work piece 24 from the chuck 61, the pinion 153 is rotated in a counterclockwise direction to impart a corresponding counterclockwise adjustment to the ring 147 which swings the links 145 and 146 in the same direction to withdraw the slides 140 and 141 to remove the work jaws 136 and 137 from engagement with the work piece 24. Similarly, when it is desired to chuck a work piece 24, the pinion 153 together with the ring 147 are moved in a clockwise direction which causes the jaws 136 and 137 to move toward the axis of rotation of the work spindle 23 to clamp a work piece 24 in operative position thereon.

The parts of the chuck 61 above described are supported on the plate 142 which is in turn supported on a plate 159. In order to provide a lateral adjustment of the plate 142 in two directions, that is, in two directions normal to the axis of rotation of the work spindle 23, the plate 142 serves as a support for a pivot stud 160 which is fastened thereto by means of a screw 161. The pivot stud 160 fits within a correspondingly shaped aperture in the plate 159. An adjusting device is provided at a point substantially diametrically opposite the pivot stud 160, comprising a stud 162 which is fastened to the plate 159. The stud 162 supports an adjusting screw 163. The plate 142 is provided with cut-out portions forming a pair of projecting lugs 164 and 165 which serve as supports for a pair of end thrust screws 166 and 167, respectively. The end thrust screws 166 and 167 are adjusted so that their inner ends bear against the ends of the adjusting screw 163 to take up any lost motion therebetween. It will be readily apparent from the foregoing disclosure that when the screw 163 is rotated, a lateral adjustment of the plate 142 together with the jaws 136 and 137 is effected in a direction normal to the axis of rotation of the work spindle 23 about the pivot stud 160 as an axis.

In order to provide a similar lateral adjustment of the chuck 61, the plate 159 is pivotally supported on the flange 135 by means of a pivot stud 170 which is fastened to the plate 159 by means of a screw 171. The pivot stud 170 fits within a correspondingly shaped aperture formed in the flange 135. The plate 159 is provided with cut-out portions, forming two projecting lugs 173 and 174 which serve as supports for end thrust screws 175 and 176. A stud 177 (Figs. 4 and 7) is fastened to the flange 135 and serves as a support for an adjusting screw 178. The ends of the adjusting screw 178 abut against the inner ends of the end thrust screws 175 and 176 so that any rotary adjustment of the screw 178 will be imparted to move the plate 159 about the pivot stud 170, as an axis, laterally to adjust the chuck parts including the work engaging jaws 136 and 137 in a lateral direction, that is, normal to the axis of rotation of the work spindle 23 and in a direction substantially at right angles to the adjustment previously described.

It will be readily apparent from the foregoing disclosure that the jaws 136 and 137 of the chuck 61 may be independently adjustable or simultaneously moved to and from an operative position, and the chuck together with the jaws 136 and 137 may be adjusted laterally in two directions so as to position the axis of the work piece 24.

The work spindle 23 is provided with elongated slots 180 and 181 through which the slides 140 and 141 together with the work engaging jaws 136 and 137 may pass. These elongated slots 180 and 181 facilitate a substantial lengthwise adjustment of the chuck 61 so as to facilitate positioning it in the desired relationship with the chuck 60 to form the proper support for a relatively long propeller blade 24.

The operation of this improved work head will be readily apparent from the foregoing disclosure. Assuming all of the parts to have been previously adjusted, a propeller blade 24 is slid within the aperture of the hollow spindle 23 in the desired longitudinal position and the blade 24 is aligned with the jaws 136 and 137, after which the operator may apply wrenches to turn the pinions 92 and 153 to move the chuck jaws 136 and 137 and 65, 66, 67 and 68 into operative clamping position to support and center the propeller blade 24 within the work spindle 23. In order to align the particular work piece with respect to its axis of balance, the chucks 60 and 61 may be laterally adjusted as desired after the chuck jaws have been clamped in adjusted position. While the work piece 24 is thus supported by the chucks 60 and 61, the work spindle 23 may be rotated and the desired grinding operation performed on the external surfaces 25 and 26 and the internal surface 27 by the grinding wheels 28 and 29.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a rotatable work support including a hollow rotatable work spindle, a multi-jaw chuck adjustably mounted on one end of said spindle, a second multi-jaw chuck slidably mounted on said spindle which is spaced from the first chuck, and means rotarily to adjust said first chuck relative to said spindle.

2. In a grinding machine having a rotatable work support including a hollow rotatable work spindle, a multi-jaw chuck adjustably mounted on one end of said spindle, a second multi-jaw chuck slidably mounted on said spindle which is spaced from the first chuck, means to adjust said second chuck longitudinally relative to said spindle, and means rotarily to adjust said first chuck relative to said spindle.

3. In a grinding machine having a rotatable work support including a hollow rotatable work spindle, a multi-jaw chuck adjustably mounted on one end of said spindle, means rotarily to adjust said chuck relative to said spindle, and means bodily to adjust said chuck relative to said spindle in a plane normal to the axis of the work spindle.

4. In a grinding machine having a rotatable work support including a hollow rotatable work spindle, a multi-jaw chuck adjustably mounted on one end of said spindle, means rotarily to adjust said chuck relative to said spindle, and means bodily to adjust said chuck relative to the axis of said spindle in one direction in a plane normal to the axis of said work spindle.

5. In a grinding machine having a rotatable work support including a hollow rotatable work spindle, a multi-jaw chuck adjustably mounted on one end of said spindle, means rotarily to adjust said chuck relative to said spindle, and means bodily to adjust said chuck relative to the axis of said spindle in two directions at substantially right angles in a plane normal to the axis of said work spindle.

6. In a grinding machine having a rotatable work support including a hollow rotatable work spindle, a multi-jaw chuck adjustably mounted on one end of said spindle, a second multi-jaw chuck on said spindle which is spaced from the first chuck, and independent means bodily to adjust both of said chucks relative to the axis of said spindle in one direction in a plane normal to the axis of the work spindle.

7. In a grinding machine having a rotatable work support including a hollow rotatable work spindle, a multi-jaw chuck adjustably mounted on one end of said spindle, a second multi-jaw chuck on said spindle which is spaced from the first chuck, and independent means bodily to adjust both of said chucks in two directions at substantially right angles in a plane normal to the axis of said work spindle.

8. In a grinding machine having a rotatable work support including a hollow rotatable work spindle, a multi-jaw chuck adjustably mounted on one end of said spindle, a second multi-jaw chuck adjustably supported on said spindle which is spaced from the first chuck, means to adjust said second chuck longitudinally on said spindle, means rotarily to adjust said first chuck relative to said spindle, and independent means bodily to adjust both of said chucks in a plane normal to the axis of said work spindle.

9. In a grinding machine having a rotatable work support including a hollow rotatable work spindle, an integral flange formed on one end of said spindle, a multi-jaw chuck adjustably mounted on said flange, a second multi-jaw chuck on said spindle which is spaced from the first chuck, means to adjust said second chuck longitudinally on said spindle, means rotarily to adjust said first chuck relative to said flange and spindle, and independent means bodily to adjust both of said chucks independently in two directions at substantially right angles to each other in a plane normal to the axis of said work spindle.

10. In a grinding machine having a rotatable work support including a hollow rotatable work spindle having a plurality of longitudinally extending clearance slots therein, a multi-jaw chuck adjustably mounted on one end of said spindle, a second multi-jaw chuck including a chuck body having a plurality of radially adjustable jaws, said chuck being slidably supported on said spindle and spaced from the first chuck and having its jaws extending through the clearance slots in said spindle, and means bodily to adjust said second chuck transversely and longitudinally relative to the axis of said spindle.

11. In a grinding machine having a rotatable work support including a hollow rotatable work spindle having longitudinally extending clearance slots therein, a multi-jaw chuck adjustably mounted on one end of said spindle, a second multi-jaw chuck on said spindle which is spaced from the first chuck having its jaws extending through the clearance slots in said spindle, means to adjust said second chuck longitudinally on said spindle, and independent means bodily to adjust both of said chucks relative to said spindle in a plane normal to the axis of said work spindle.

CARL G. FLYGARE.
HERBERT A. SILVEN.